United States Patent
Derrien

(10) Patent No.: US 11,312,059 B2
(45) Date of Patent: Apr. 26, 2022

(54) MOLDING UNIT EQUIPPED WITH A BOXING SYSTEM WITH A PROPORTIONAL SOLENOID VALVE

(71) Applicant: SIDEL PARTICIPATIONS, Octeville-sur-Mer (FR)

(72) Inventor: Mikaël Derrien, Octeville-Surmer (FR)

(73) Assignee: SIDEL PARTICIPATIONS, Octeville-sur-Mer (FR)

(*) Notice: Subject to any disclaimer, the term of this patent is extended or adjusted under 35 U.S.C. 154(b) by 617 days.

(21) Appl. No.: 16/161,361

(22) Filed: Oct. 16, 2018

(65) Prior Publication Data
US 2019/0111607 A1  Apr. 18, 2019

(30) Foreign Application Priority Data
Oct. 16, 2017 (FR) ...................................... 1759657

(51) Int. Cl.
| | |
|---|---|
| *B29C 49/78* | (2006.01) |
| *B29C 49/48* | (2006.01) |
| *B29C 49/42* | (2006.01) |
| *B29L 31/00* | (2006.01) |
| *B29K 67/00* | (2006.01) |
| *B29C 49/06* | (2006.01) |

(52) U.S. Cl.
CPC ...... *B29C 49/4815* (2013.01); *B29C 49/4289* (2013.01); *B29C 49/48* (2013.01); *B29C 49/78* (2013.01); *B29C 49/06* (2013.01); *B29C 2049/4892* (2013.01); *B29C 2949/78546* (2013.01); *B29C 2949/78563* (2013.01); *B29C 2949/78857* (2013.01); *B29K 2067/003* (2013.01); *B29L 2031/7158* (2013.01)

(58) Field of Classification Search
None
See application file for complete search history.

(56) References Cited

U.S. PATENT DOCUMENTS

| | | | |
|---|---|---|---|
| 2015/0042021 A1* | 2/2015 | Schmid ................ | B29C 49/783 264/526 |
| 2015/0290867 A1 | 10/2015 | Derroem et al. | |

(Continued)

FOREIGN PATENT DOCUMENTS

| | | |
|---|---|---|
| DE | 10 2006 061301 A1 | 6/2008 |
| WO | 2013160436 A1 | 10/2013 |
| WO | 2016/083711 A1 | 6/2016 |

OTHER PUBLICATIONS

Protais WO-2016083711 English Translation (Year: 2016).*
(Continued)

*Primary Examiner* — Jacob T Minskey
*Assistant Examiner* — Adrien J Bernard

(57) ABSTRACT

A molding unit for the manufacturing of a container from a blank made of plastic material includes: a mold equipped with a wall and a movable insert; and at least one boxing system including a cylinder that is integral with the insert. The boxing system includes: at least one solenoid valve mounted on a primary fluid circuit, with this solenoid valve including a fluid outlet connected to a primary chamber and that defines a variable passage section based on an electric control signal applied to the solenoid valve; and a processing unit connected to the solenoid valve and programmed to vary the electric control signal applied to the latter.

13 Claims, 5 Drawing Sheets

(56) References Cited

U.S. PATENT DOCUMENTS

2016/0332355 A1* 11/2016 Rymann .................. B29C 49/66
2017/0021550 A1    1/2017 Derrien et al.
2017/0326780 A1    11/2017 Protais et al.

OTHER PUBLICATIONS

How a Solenoid Valve Works, Apr. 26, 2017 Wayback Machine Screenshot. https://web.archive.org/web/20170426173402/https://www.instrumentationtoolbox.com/2016/06/how-solenoid-valve-works.html (Year: 2017).*

Proportional Solenoid Valve—How They Work, Tameson. https://tameson.com/proportional-solenoid-control-valve.html#:~:text=A%20proportional%20control%20valve%20is,mainly%20level%2C%20pressure%20and%20temperature. (Year: 2021).*

FR Search Report, dated Jul. 9, 2018, from corresponding FR 1 759 657 application.

CN Office Action, Application No. 201811193509.7, dated Sep. 10, 2021.

English translation of CN Office Action dated Sep. 10, 2021.

* cited by examiner

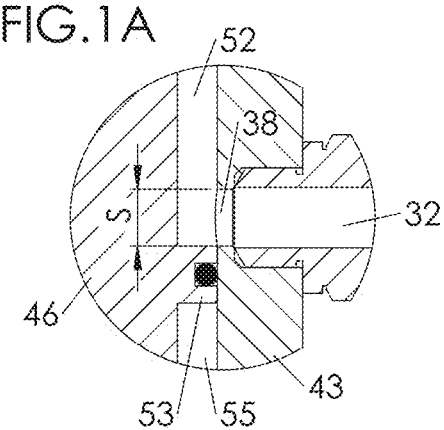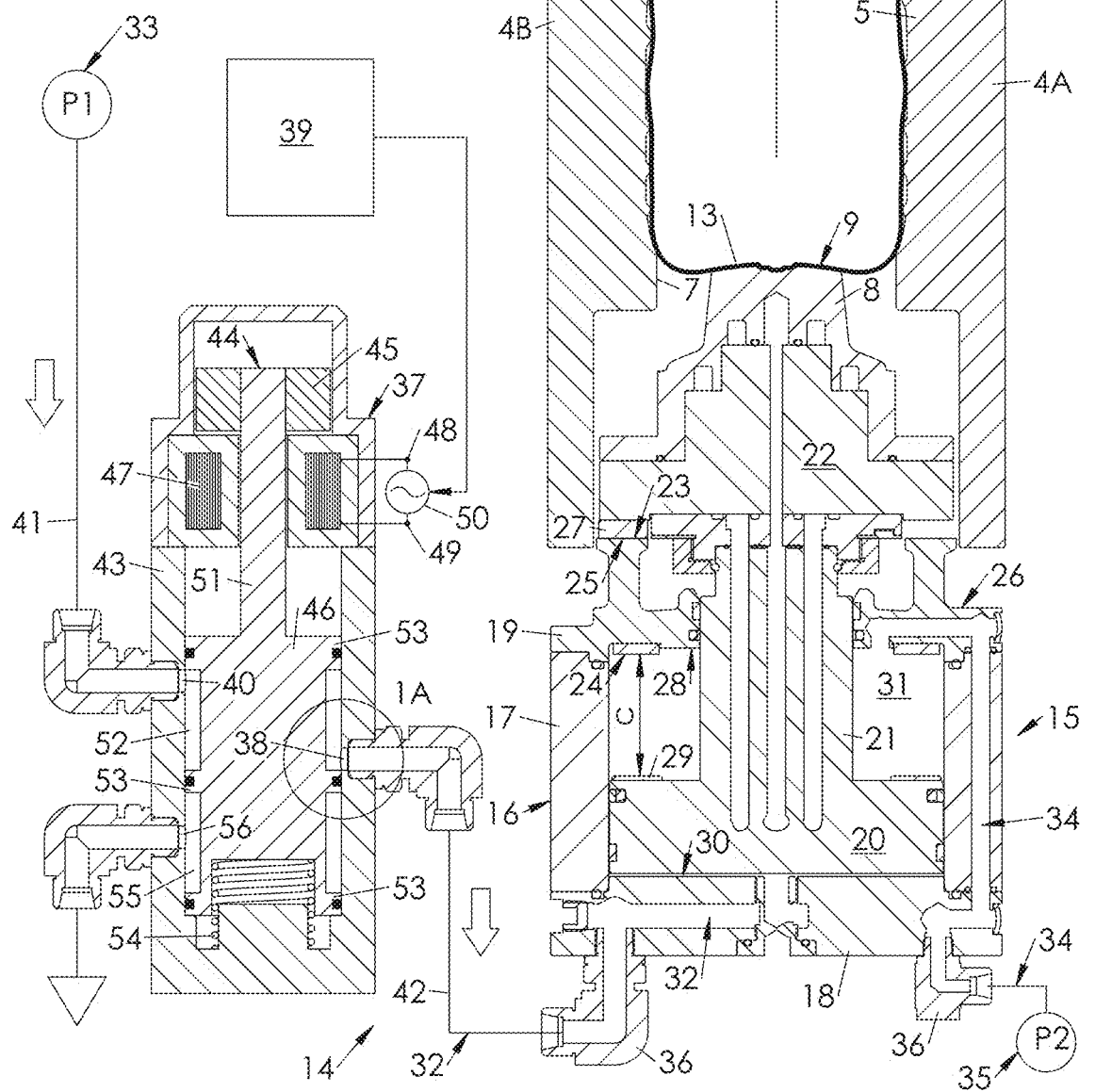

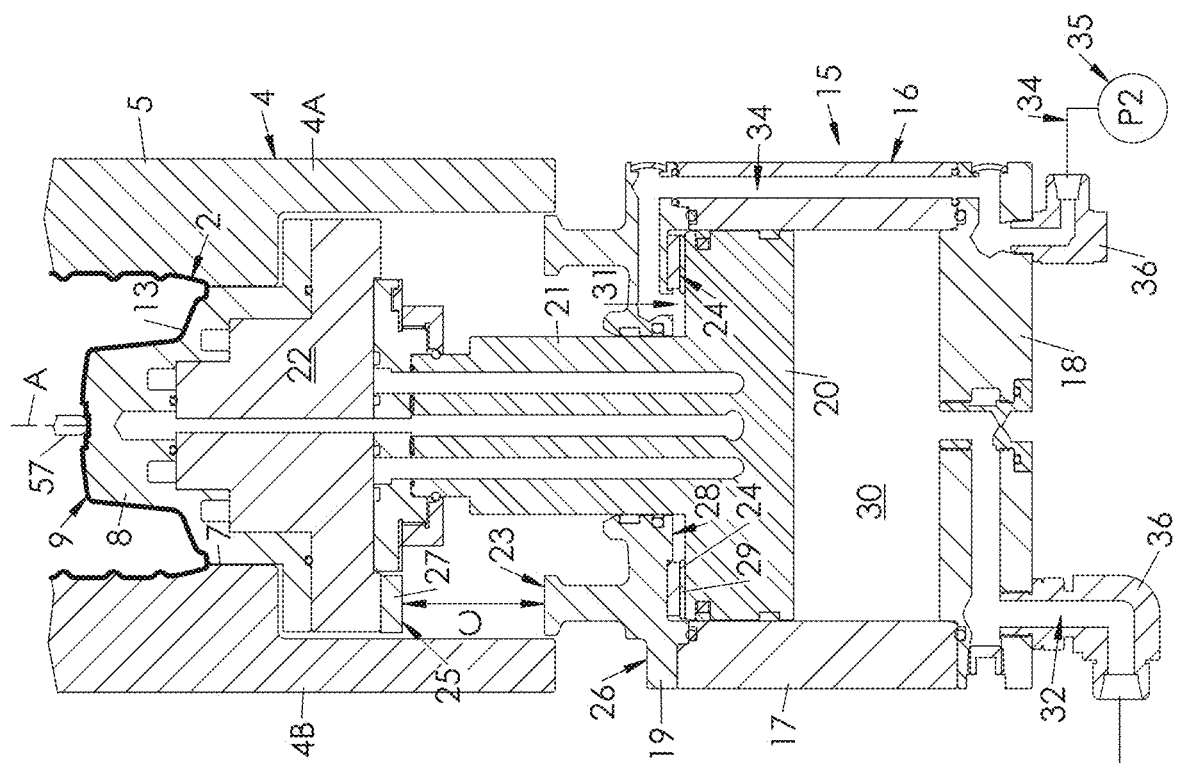
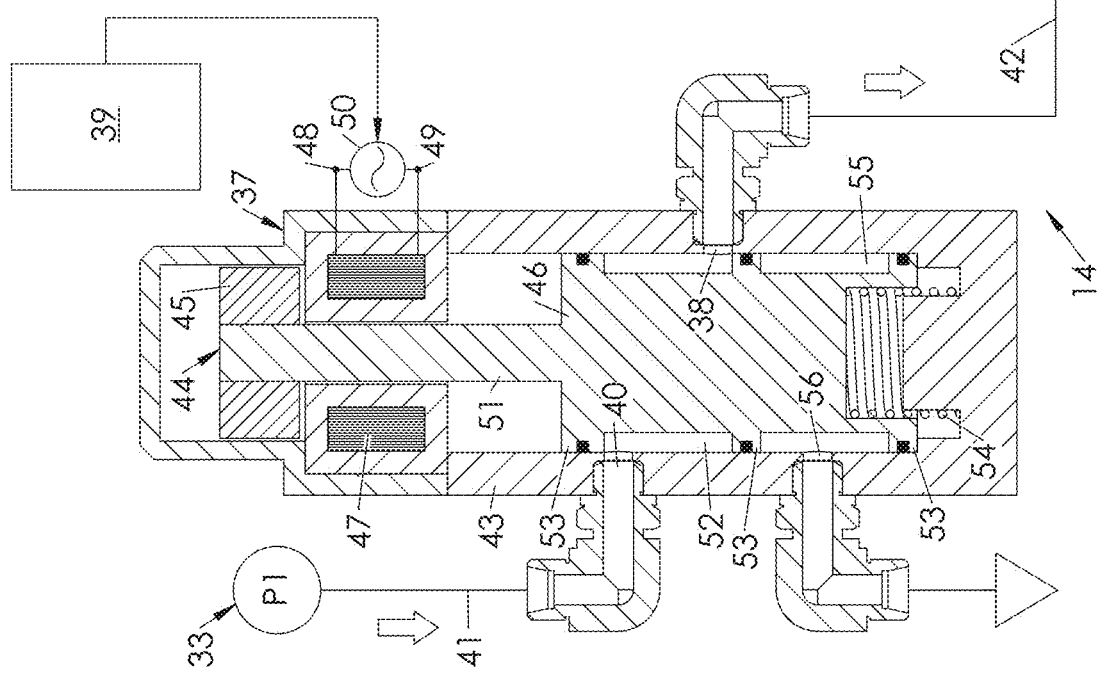
FIG.3

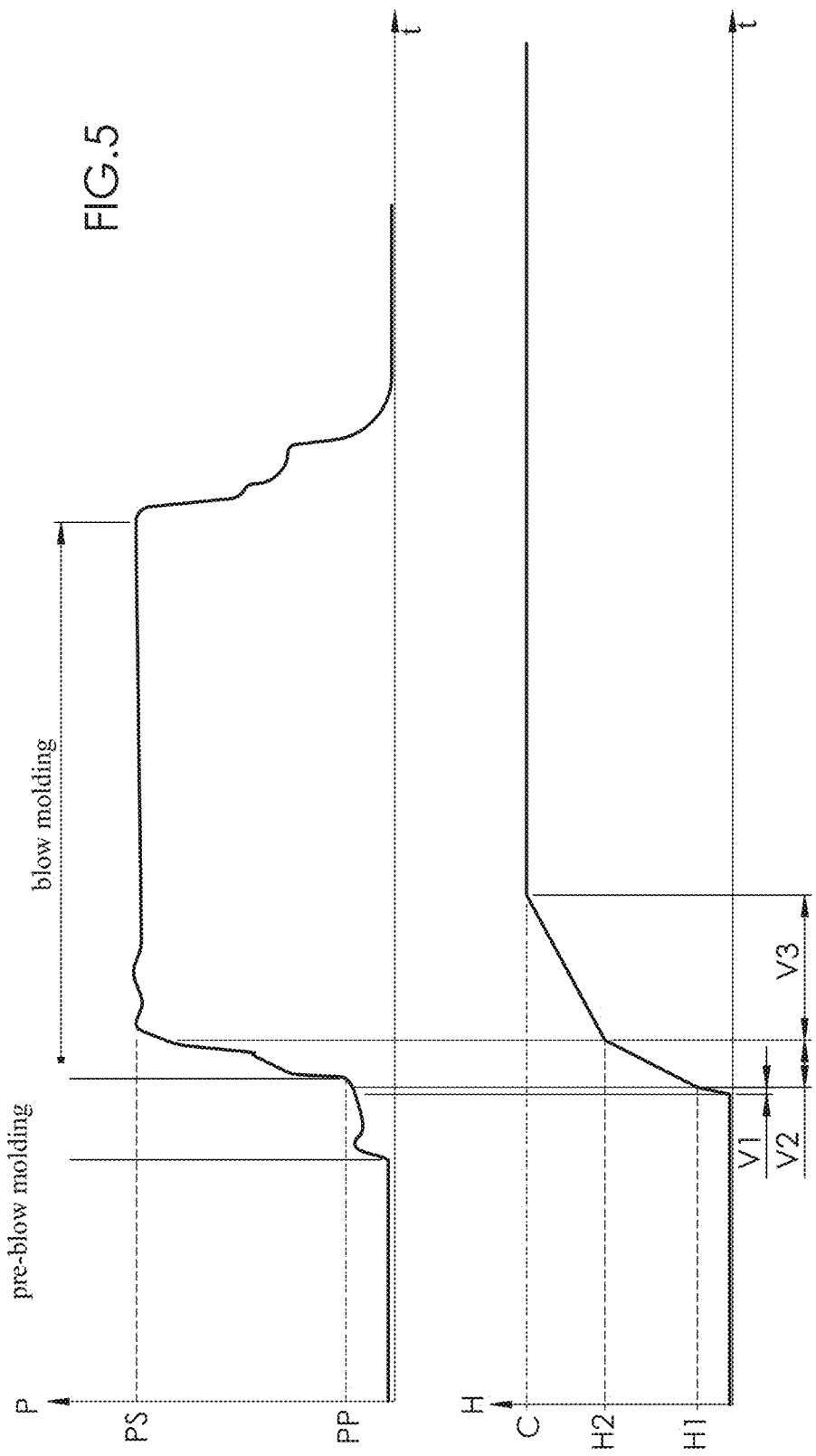

MOLDING UNIT EQUIPPED WITH A BOXING SYSTEM WITH A PROPORTIONAL SOLENOID VALVE

BACKGROUND OF THE INVENTION

Field of the Invention

The invention relates to the manufacturing of containers by forming blanks made of plastic material, such as polyethylene terephthalate (PET).

Description of the Related Art

Ordinarily, a container comprises a body, a bottom that closes the body at a lower end of the latter, and a neck that opens at an upper end of the body to allow the container to be filled and emptied.

The container is manufactured by forming from a blank, i.e., a preform or an intermediate container that is itself obtained from a preform that has undergone a preliminary preforming operation.

A conventional container manufacturing technique is blow molding (optionally coupled with stretching). This technique consists in inserting the blank, heated in advance to a temperature that exceeds the glass transition temperature of the material (approximately 80° C. in the case of PET), into a mold equipped with a wall that defines a cavity that bears the impression of the container, and in injecting a fluid, such as a pressurized gas (generally air), through the neck of the blank in order to flatten the material against the wall of the mold.

In general, the forming even comprises two consecutive phases: a pre-blow-molding phase during which a fluid is injected into the blank at a pre-blow-molding pressure, and a blow-molding phase during which a fluid is injected into the blank at a blow-molding pressure that exceeds the pre-blow-molding pressure. In conventional methods, where air is used to carry out the forming, the pre-blow-molding pressure is between 5 and 10 bar, and the blow-molding pressure is between 20 and 40 bar.

Certain applications make it necessary to form recessed reserved spaces on the container for a purpose that may be aesthetic (for example, for creating curves), functional (for example, for creating a handle for the gripping of the container), or else structural (for example, for creating a bottom that has undergone additional stretching and that is designed to absorb the deformation of the container during a hot filling).

When such a reserved space reaches a certain depth, the container cannot be formed in an ordinary mold because, despite the elevated blow-molding pressure, the latter is unable to apply the material completely against the relief of the mold that is designed to form the reserved space, primarily in the areas that are turned to face the neck of the container from which the blow-molding bubble develops.

Also, a container provided with such a reserved space in a mold equipped with a movable insert (typically a mold bottom) that is initially retracted into the wall of the mold and deployed during forming in order to push back the wall of the container is usually formed. This technique is illustrated in particular in the international application WO 2016/083711 (Sidel Participations), which describes a double-action cylinder equipped with a piston on which the insert is mounted, with this piston delimiting within the cylinder a primary chamber whose pressurization moves the insert toward its deployed position, and a secondary chamber whose pressurization (simultaneously to the depressurization of the primary chamber) moves the insert toward its retracted position.

Such a push back (called boxing) is used in particular for forming a container equipped with an integrated handle or a bottom that has undergone additional stretching and is designed to absorb the deformation of the container during a hot filling.

Boxing is a complex operation.

A first difficulty of boxing is that the movable insert should, during its movement, overcome the resistant force opposed by the blank. However, this resistant force is variable, to large extents, and for multiple reasons.

First, the pressure prevailing in the blank (pressure on which the resistant force depends) is itself variable. Actually, not only is a fluid injected into the blank at different pressures (pre-blow-molding pressure and then blow-molding pressure), but, in addition, the volume of the blank increases during forming until reaching the wall of the mold.

Second, the surface of the blank in contact with the insert (surface on which the resistant force also depends) also varies during forming.

Third, the current forming methods most often include a so-called recovery phase, which consists in reinjecting a portion of the pressurized air obtained from the blow molding of the container into an air circuit for subsequent reuse. This recovery triggers variations in pressure and in air flow toward the container or coming from the latter. The result is a variation in the resistant force opposed by the blank.

A second difficulty of boxing arises from the compressibility of the gas that is used to control the cylinder on which the insert is mounted. As described in the above-mentioned international application WO 2016/083711, the secondary chamber of the cylinder is connected to a flow restrictor whose function is to modulate (and, more specifically, to reduce) the rate of travel of the insert (in this case, a mold bottom) in particular based on the capacity of the container, of the diameter of the insert (i.e., in this case, of the mold bottom). This modulation is produced by varying the flow of air to the exhaust. However, the compressibility of the gas causes the action of the flow restrictor to be subject to a delay. When the travel of the insert is small, typically 15 mm, the intervention of the flow restrictor causes the insert to be slowed only over a very short distance, at the end of the boxing. In this case, the insert has traveled most of its course before the blow-molding pressure has even been reached in the blank during forming, to the detriment of the impression-taking (and therefore of the quality of the container). To increase the braking of the insert, it would be possible to close the flow restrictor a little more, but in this case, the resistant forces being applied to the cylinder would prevent the latter from completing its travel.

A third difficulty of boxing is linked to the variety in size of the recessed reserved spaces (respectively the variability in dimensions of the inserts—typically diameters of the mold bottoms) to be formed. In practice, the cylinders are sized to be able to ensure the boxing of large-area reserved spaces (for example, large-diameter bottoms). However, these cylinders turn out to be over-large when they are used for the boxing of comparatively smaller-area reserved spaces. In this case, their inertia makes the modulation of their speed more complex by a simple regulation of the pressure.

Actually, when the reserved space that is to be formed has a small area, the forces opposed by the blank during forming are weak, and the simplest measure consists in increasing the action of the flow restrictor to brake the movement of the insert. The risk created by this measure, however, is that it may block the insert completely before it has reached its end of travel.

This shows that the current boxing techniques, including that described in the above-mentioned application WO 2016/083711, do not make it possible to monitor the rate of travel or the position of the insert precisely. In practice, it is noted that frequently, its travel is too fast, or, in contrast, too slow. To summarize, in numerous cases, the rate of travel of the insert is not controlled.

SUMMARY OF THE INVENTION

The purpose of the invention is to overcome these difficulties. More precisely, an objective of the invention is to propose a molding unit equipped with a boxing system that makes it possible to monitor in a more effective and precise manner the position and/or the rate of travel of the insert, in particular based on the pressure that prevails in the container during forming.

For this purpose, a molding unit is proposed for the manufacturing of a container from a blank made of plastic material, with this molding unit comprising:

A mold equipped with a wall that defines a cavity bearing the impression of the container and an insert that is movable in relation to the wall between a retracted position, in which it extends set back in relation to the cavity, and a deployed position, in which it projects at least partially into the cavity;

At least one boxing system that comprises a cylinder provided with a cylinder body, a piston, and a rod that is integral with the piston and on which the insert is attached, with the rod and the piston being integrally movable between a retracted position that corresponds to the retracted position of the insert and a deployed position that corresponds to the deployed position of the insert, with the cylinder body and the piston jointly defining, on both sides of the piston, a primary chamber that is connected, via a primary fluid circuit, to a primary fluid source under a primary pressure, and a secondary chamber that is connected, via a secondary fluid circuit, to a secondary fluid source under a comparatively lower secondary pressure, with this molding unit being characterized in that the boxing system also comprises:

At least one solenoid valve mounted on the primary fluid circuit, with this solenoid valve comprising a fluid outlet connected to the primary chamber and defining a variable passage section based on an electric control signal applied to the solenoid valve;

A processing unit connected to the solenoid valve and programmed to vary the electric control signal applied to the latter.

Owing to this structure, it is possible to control precisely the position and the rate of travel of the piston (and therefore of the insert), enhancing the quality of the container that is produced.

According to a particular embodiment, the solenoid valve comprises:

A case pierced by an opening that forms the fluid outlet connected to the primary chamber, A movable assembly provided with a ferromagnetic core and a seal whose position in relation to the fluid outlet determines the flow rate of fluid that travels through the latter, A solenoid that is integral with the case and that surrounds the core, with this solenoid having two electric terminals to which the electric control signal is applied, with the processing unit being programmed to vary the electric signal applied to the terminals of the solenoid.

The solenoid valve is advantageously configured so that the passage section of the fluid outlet and the electric control signal are linked by the following function:

$$S = K1.E + K2$$

where:
E is the electric control signal
S is the passage section of the fluid outlet
K1 is a coefficient (real number)
K2 is a constant.

The electric signal is, for example, an intensity or an electric voltage.

According to an embodiment, the molding unit comprises a sensor that can make it possible to determine the position or the speed of the insert during its movement from the retracted position to the deployed position, and the processing unit is programmed to vary the electric control signal of the solenoid valve based on the position or the speed of the insert.

BRIEF DESCRIPTION OF THE DRAWINGS

Other objects and advantages of the invention will emerge from the description of an embodiment, given below with reference to the accompanying drawings. In these drawings:

FIG. 1 is a cross-section of a molding unit, in the retracted position of the insert, before complete forming of the container;

FIG. 1A is a detail on a larger scale of the solenoid valve for control of the movement of the insert;

FIG. 3 is a detail cross-section similar to FIG. 2, showing the molding unit in the deployed position of the mold bottom, whereas the bottom of the container is completed;

FIG. 5 is a diagram that comprises two curves that illustrate respectively the variations in pressure in the container during forming in the molding unit and the corresponding position of the insert.

DESCRIPTION OF THE PREFERRED EMBODIMENTS

Figure 2:
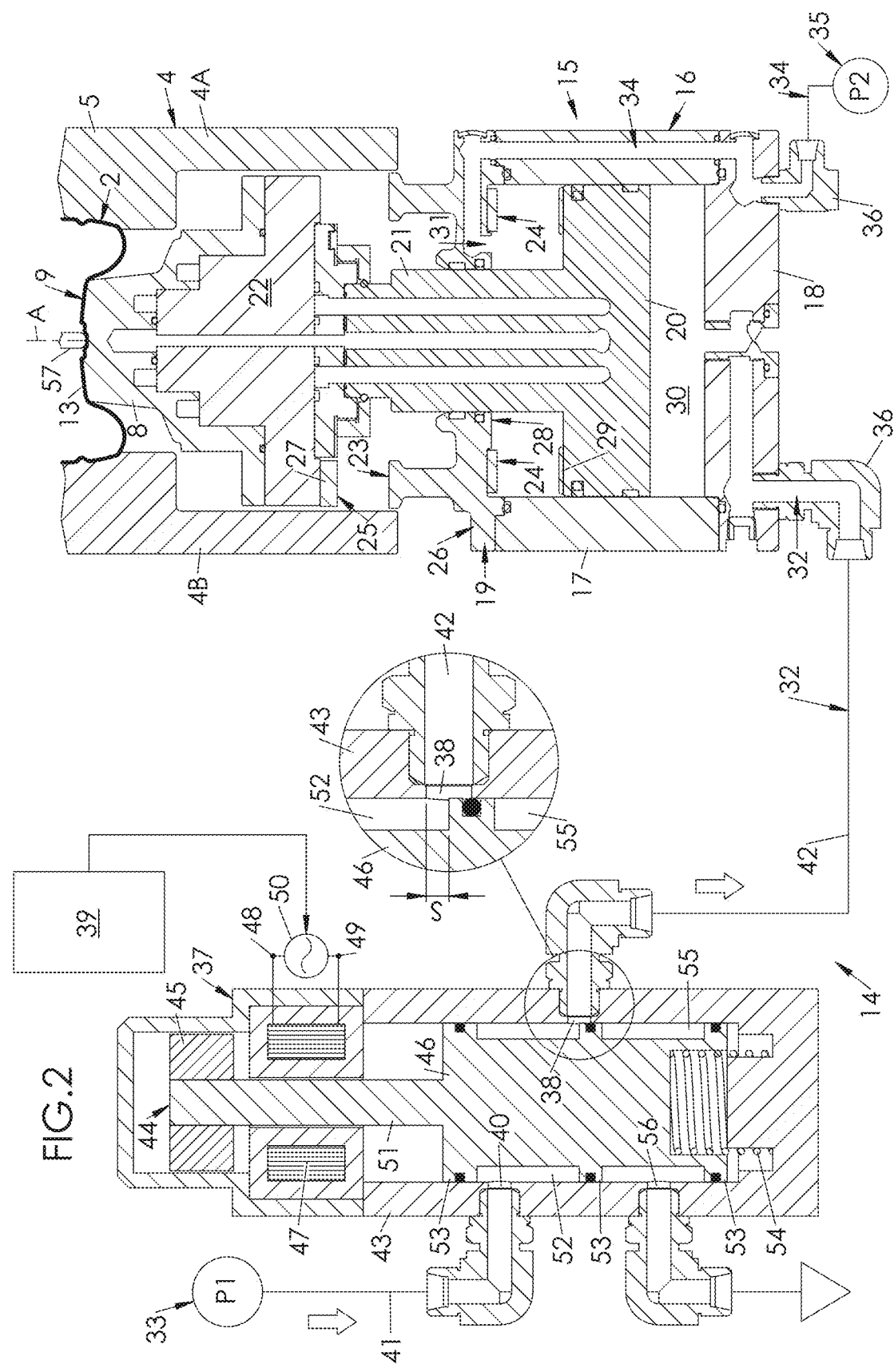
FIG. 2 is a detail cross-section, on an enlarged scale, of the molding unit of FIG. 1, in a median position of the insert, with the container in the process of being formed and with, in an inset, a detail on a larger scale of the solenoid valve.

FIG. 1 to FIG. 4 show a molding unit 1 for the manufacturing of a container 2 by blow molding (or by stretch blow molding) from a blank 3 made of plastic material. In the illustrated example, the blank 3 is a preform, but it could be an intermediate container obtained from a preform that has undergone one or more preliminary forming operations. According to a preferred embodiment, the material in which the blank is made is PET.

In the first place, the molding unit 1 comprises a mold 4.

This mold 4 comprises a wall 5 formed by two hinged half-molds 4A, 4B, defining an inner cavity 6 distributed around a main axis A of the mold 4 that, when the containers 2 to be formed are rotationally symmetrical, forms an axis of symmetry of the mold 4.

The cavity 6 defines at least partially an impression for a side wall or body of the container 2. The wall 5 has an opening 7 that defines a passage for an insert 8 that is mounted to move in relation to the wall 5 between a retracted position, illustrated in FIG. 1, in which the insert 8 is separated from the opening 7 (and therefore extends set back in relation to the cavity 6), and a deployed position, illustrated in FIG. 2, in which the insert 8 projects at least partially into the cavity 6.

In the illustrated example, the insert 8 forms a mold bottom, complementary to a bottom of the container 2 to be formed. In this case, the opening 7 is formed in a lower part of the wall 5; as a variant, the insert 8 could be a lateral drawer, designed to form, on the container 2, for example, a handle designed to make it easy to grasp. According to a particular embodiment, the opening 7 has a circular contour. Its inside diameter is denoted D.

The insert 8 has a molding surface 9 defining an impression for the part in question of the container 2. In the deployed position, the insert 8 closes the cavity 6, thus completing the impression of the container 2, against which the material is applied during the blow molding. The distance that separates the retracted position from the deployed position is called "course" of the insert 8, denoted C. For purposes of clarity, the mold 4 is shown in a configuration where the course C is relatively long with regard to the height of the container 2 (typically of approximately 40 mm for a container 2 with a 0.5 l capacity). This configuration is in no way limiting; in contrast, the course C can be short with regard to the height of the container (typically less than or equal to 15 mm for a container 2 with a 0.5 l capacity).

As illustrated in FIG. 1, the blank 3 (shown in dotted lines) and then the container 2, formed from the latter, rest on an upper face of the mold 4 by means of a collar 10 of the blank 3 (respectively of the container 2), which delimits a neck 11 of the blank 3 (respectively of the container 2), kept outside of the mold 4. In FIG. 1, the container 2 is not totally formed (its outside wall does not yet conform totally to the wall 5 of the mold), hence the use of the reference 2, 3 to refer to the container that is in the process of being formed and is therefore no longer totally a blank 3 but not yet a finished container 2.

Under the collar 10, the blank 3 (and then the container 2) has a body 12, which extends overall in the axial direction, and a bottom 13, which is first of all hemispherical (FIG. 1), and then, once formed against the insert 8 (FIG. 2), extends overall in the radial direction from a lower end of the body 12. This configuration corresponds to the case where the insert 8 is a mold bottom.

To form the container 2, the blank 3 is inserted into the mold 4, and a fluid (preferably a gas, for example air) is injected under pressure. In a conventional manner, as illustrated by the upper diagram of FIG. 5, the forming can comprise two phases, namely:

- A pre-blow-molding phase (denoted "présoufl." in FIG. 5), during which a fluid is injected into the blank 3 at a so-called pre-blow-molding pressure PP; according to a particular embodiment, the pre-blow-molding pressure PP is less than or equal to 15 bar, and, for example, on the order of 7 to 12 bar;
- A blow-molding phase (identified as such in FIG. 5), during which a fluid is injected into the blank 3 at a so-called blow-molding pressure PS; according to a particular embodiment, the blow-molding pressure PS is greater than or equal to 15 bar, and, for example, on the order of 30 to 40 bar.

In the second place, the molding unit 1 comprises a boxing system 14. The term "boxing" is employed here to refer to an operation for pushing back the material of the container 2 during forming.

This boxing system 14 comprises, firstly, a cylinder 15 for control of the position of the insert 8. This cylinder 15 comprises a cylinder body 16. The cylinder body 16 is equipped with a cylindrical jacket 17, a lower wall 18, and an upper wall 19 that closes the jacket at each of its ends. The cylinder 15 also comprises a piston 20, mounted to slide in the cylinder body 16. More precisely, the piston 20 is mounted to slide in the jacket 17, between the walls 18, 19.

As can be seen in FIG. 1 to FIG. 4, the cylinder 15 also comprises a rod 21 that is integral with the piston 20. This rod passes through, in an airtight manner, the upper wall 19 through a complementary opening that is made in the latter.

The insert 8 is attached to the rod 21. More precisely, in the illustrated example, the insert is attached to the rod 21 at an upper end of the latter that projects outside of the cylinder body 16, by means of a stand 22. The attachment of the insert 8 to the stand 22 (just like that of the stand 22 to the rod 21) can be carried out in a conventional manner, for example by screwing.

The piston 20 and the rod 21 are integrally movable in relation to the cylinder body 16 between a retracted position, corresponding to the retracted position of the insert 8 (FIG. 1), and a deployed position, corresponding to the deployed position of the insert 8 (FIG. 2).

The molding unit 1 comprises two stops defining the end positions of the insert 8, namely:

- A first end-of-travel stop 23, a so-called lower stop 23, defining the retracted position of the insert 8, which retracted position is a lower position in the embodiment, hence its name, and
- A second end-of-travel stop 24, a so-called upper stop 24, defining the deployed position of the insert 8, which deployed position is an upper position in the embodiment, hence, there again, the name of upper stop.

The stops 23, 24 can be arranged to come into contact directly with the insert 8, or else with the piston 20.

According to an embodiment, the lower stop 23 is placed opposite a lower support face 25 of the insert 8, for contact with the latter in the retracted position.

Thus, in the illustrated example, the lower stop 23 is formed beside an outer face 26 of the upper wall 19. More precisely, as illustrated in FIG. 4, the lower stop 23 is formed by an axial end face with an annular ring that is formed projecting on the upper wall 19 from the outer face 26 of the latter.

Figure 4:
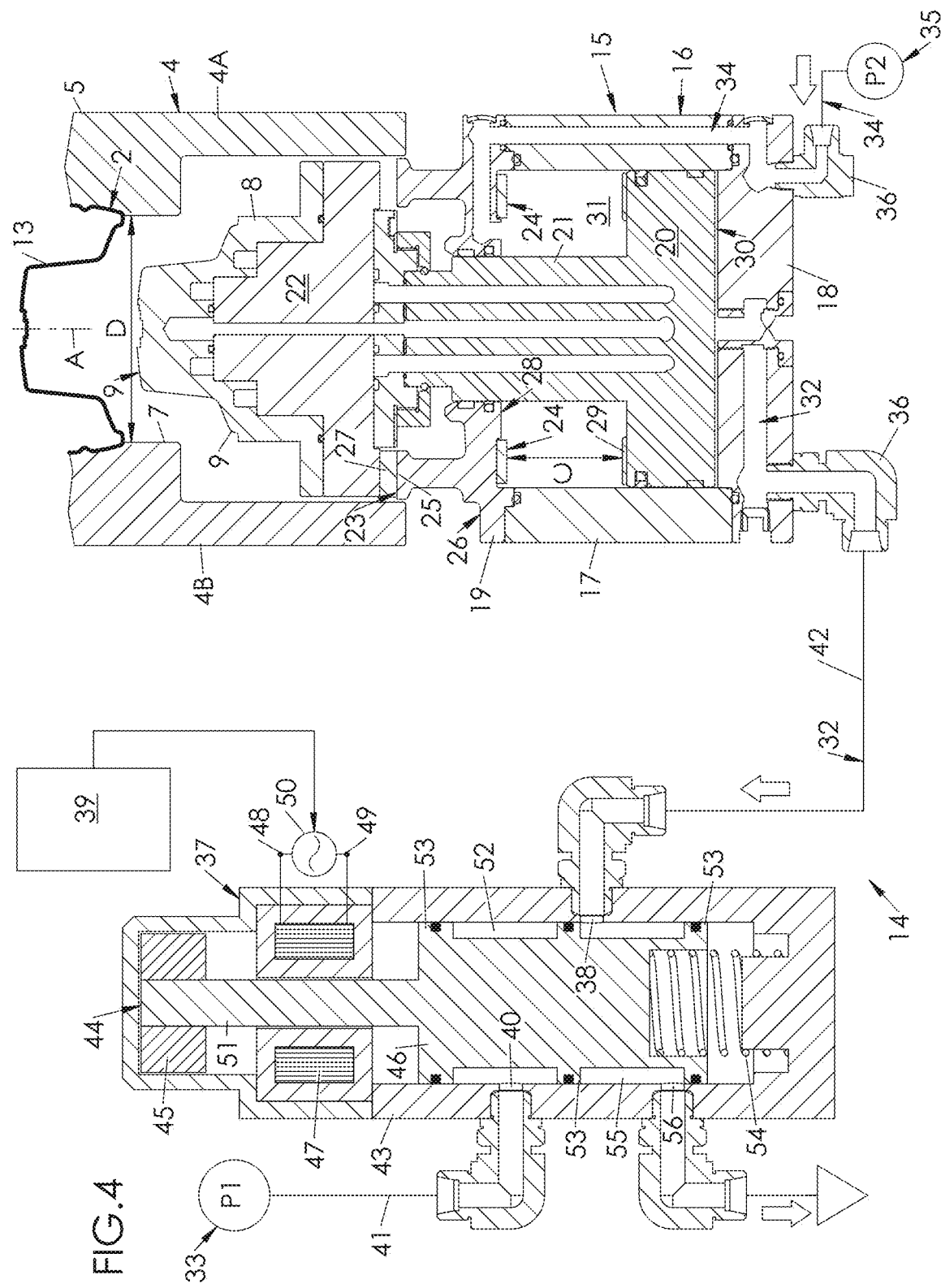
FIG. 4 is a view similar to FIG. 2, showing the molding unit in the retracted position of the mold bottom, after the forming of the container.

As can be seen in FIG. 4, the lower support face 25 of the insert 8 can be formed by one or more connected buffers 27, which can, in addition to the stop function, produce a damping function contributing to the quiet running of the molding unit 1.

Furthermore, the upper stop 24 can be placed opposite the piston 20, for contact with the latter in the deployed position.

Thus, in the illustrated example, the upper stop 24 is formed beside an inner face 28 of the upper wall 19. More precisely, as illustrated in FIG. 4, the upper stop 24 is formed by an annular shim that is integral with the upper wall 19. To limit the wear and tear of the piston 20 in contact with the upper stop 24, the latter can support a washer 29 that is applied against the upper stop 24 in the deployed position.

As FIG. 2 and FIG. 4 clearly show, the body 16 and the piston 20 jointly define, on both sides of the piston 20, two fluid chambers, namely a primary chamber 30 and a secondary chamber 31.

In the illustrated example, the primary chamber 30 is delimited by the piston 20 and the lower wall 18. The secondary chamber 31 is delimited by the piston 20 and the upper wall 19.

The boxing system comprises, secondly, a fluid circuit for control of the movement of the piston 20. This fluid circuit comprises:

A primary fluid circuit 32 by which the primary chamber 30 can be connected to a primary fluid source 33 (air, water, oil, etc.) under a primary pressure P1, and A secondary fluid circuit 34, by which the secondary chamber 31 is connected to a secondary fluid source 35 (air, water, oil) under a comparatively lower secondary pressure P2 (i.e., lower than the primary pressure P1).

The primary pressure P1 is advantageously greater than or equal to 10 bar, and preferably equal (or approximately equal) to 25 bar. Whereas the blow-molding pressure PS can reach 40 bar, it is noted that the primary pressure P1, necessary to boxing, can therefore be less than the blow-molding pressure PS, while making it possible to ensure a correct boxing: this is possible by manipulating the dimensions of the cylinder. It is enough for the surface of the piston to be greater than the surface of the insert or of the bottom to be boxed and for the pressure P1 to be selected in such a way that the forces exerted by the insert on the bottom exceed those exerted by the interior of the container 2. According to a particular embodiment where the blow-molding pressure PS is equal (or approximately equal) to 25 bar, the primary source 33 can be combined with the source where the fluid with which the blow-molding phase is conducted is drawn. The primary pressure P1 and the blow-molding pressure PS can therefore be different; it is actually possible to regulate them at different values (according to their respective needs) by means of separate pressure relief valves.

Furthermore, the secondary pressure P2 is advantageously less than or equal to 10 bar, and preferably equal (or approximately equal) to 7 bar.

As FIG. 1 to FIG. 4 clearly show, the primary fluid circuit 32 is partially formed in the lower wall 18; as for the secondary fluid circuit 34, it is partially formed in the lower wall 18, in the jacket 17 and in the upper wall 19. The connection of the portions of the circuits 32, 34 formed in the lower wall 18 to fluid intake tubes can be carried out, as in the illustrated example, by means of connectors 36 connected and screwed onto the lower wall 18.

So as to control the position and the rate of travel of the piston 20 (and therefore of the insert 8), and as illustrated in FIG. 1 to FIG. 4, the boxing system 14 comprises a solenoid valve 37, mounted on the primary fluid circuit 32. This solenoid valve 37 comprises a fluid outlet 38, which is connected to the primary chamber 30 and which defines a passage section S that is variable based on an electric control signal E applied to the solenoid valve 37.

The boxing system 14 also comprises a programmable processing unit 39, connected to the solenoid valve 37 and programmed to vary the electric control signal E applied to the latter.

More precisely, and as illustrated in FIG. 1 to FIG. 4, the solenoid valve 37 comprises, in addition to the outlet 38, a fluid intake 40 by which the solenoid valve 37 is connected to the primary source 33, via a pipe 41 shown in a diagram by a line in FIG. 1 to FIG. 4. Likewise, the fluid outlet 38 is connected to the primary chamber 30 (via a connector 36) by a pipe 42 shown in a diagram by a line in FIG. 1 to FIG. 4.

According to an embodiment illustrated in the drawings, the solenoid valve 37 has an electromagnetic control, and it comprises:

A case 43 pierced by an opening (forming the fluid outlet 38) connected to the primary chamber 30, A movable assembly 44 provided with a ferromagnetic core 45 and a seal 46 whose position in relation to the fluid outlet 38 determines the flow rate of fluid that travels through the latter, A solenoid 47 that is integral with the case 43 and that surrounds the core 45, with this solenoid 47 having two electric terminals 48, 49 to which the electric control signal is applied, with the processing unit 39 being programmed to vary the electric signal E applied to the terminals 48, 49 of the solenoid via a generator 50.

The electric signal E can be a current. In this case, the generator 50 is a variable control current generator, controlled by the processing unit 39.

As a variant, the electric signal E is a voltage. In this case, the generator 50 is a variable control voltage generator, controlled by the processing unit 39.

The processing unit 39 can be a processor (CPU—Central Processing Unit) integrated with a conventional computer system (server or personal computer) or with a programmable logic controller (PLC).

In the example illustrated in FIG. 1 to FIG. 4, the core 45 is integral with the seal 46 by means of a rod 51. The seal 46 comprises, in this example, at least one diameter restriction, delimited by two collars 53 in airtight sliding contact with an inner wall of the case 43, and which defines with this wall a pressurization chamber 52 into which the fluid outlet 38 and/or the fluid intake 40 empty.

As FIG. 1 to FIG. 4 clearly show, the solenoid valve 37 is provided with a return spring 54 that is inserted between the case 43 and the seal 46.

When the solenoid 47 is supplied with electricity (by charging or forced current circulation), it generates an electric field that moves the ferromagnetic core 45 against the return spring 54.

According to an embodiment that is illustrated in the drawings, the seal 46 comprises a second diameter restriction delimited by two collars 53 in airtight sliding contact with the inner wall of the case 43 and that defines with this wall a degassing chamber 55. Furthermore, the case 43 is pierced by another opening that defines a drain 56 connected to the atmospheric pressure.

The movable assembly is mounted between two end positions, namely:

An open position, illustrated in FIG. 1, in which the fluid outlet 38 and the fluid intake 40 both empty completely (in this case, the section S is maximum) in the pressurization chamber 52, which puts the primary chamber 30 in fluid communication with the primary source 33, and A degassing position, illustrated in FIG. 4, in which the fluid outlet 38 and the drain 56 both empty completely into the degassing chamber 55, which puts the primary chamber 30 in communication with the atmosphere.

The solenoid valve 37 is configured so that the passage section S of the fluid outlet 38 and the electric control signal E are linked by the following function:

$$S = K1 \cdot E + K2$$

where K1 is a coefficient (a real number, preferably strictly positive), and K2 is a constant.

It is seen that the function that links the electric control signal E to the passage section S is a proportional law. The coefficient K1 is named "proportionality coefficient."

In practice, the force (intensity or voltage) of the electric signal E determines—via the core 45 subjected to the electromagnetic field generated by the solenoid—the position of the seal 46, one of whose collars 53 more or less seals (up to seals completely or seals not at all) the fluid outlet 38, and thus determines the passage section S.

It will be noted that the fluid flow rate (or pressure) immediately downstream from the fluid outlet 38 is not necessarily in a relationship of proportionality with the electric control signal E, since this flow rate (or this pressure) depends on fluid conditions in the primary chamber 30, which depend in part on the resistant forces undergone by the piston 20, which for their part result from the pressure that prevails in the secondary chamber 31, which is applied directly to the piston 20, and the pressure that prevails in the blank 3, which is applied to the piston 20 via the insert 8 and the rod 21.

However, it is not necessary that this flow rate or this pressure is in such a relationship of proportionality to the electric signal E so that the position or the speed of the piston 20 (and therefore the insert 8) is finely regulated by the processing unit 39 via the solenoid valve 37.

Actually, it is feasible to implement in the boxing system 14 a feedback loop that makes it possible to control the value (or the force) of the electric signal E based on a measurement of the position or the real speed of the insert 8 (or, which amounts to the same thing, of the piston 20).

For this purpose, the boxing system 14 can be equipped with a sensor that can measure (or make it possible to determine by calculation) the position or the speed of the insert 8 during its movement from its retracted position to its deployed position. In this case, the processing unit 39 is programmed to vary the electric control signal E of the solenoid valve 37 based on various parameters comprising in particular the position or the speed of the insert 8 (thus determined), by reference to a reference blow-molding curve (FIG. 5) recorded in the processing unit 39.

It was discovered that it is possible to correctly form the impression of the insert 8 (in this case, the bottom 13 of the container 2) by correctly controlling the rate of travel of the insert 8.

Actually, it was possible to establish a cause and effect relationship between significant variations in the rate of travel of the insert 8 (cause) and disparities in the quality of the containers produced (effect).

These disparities are due to the fact that the significant variations in the pressure prevailing in the container 2 during forming and the disparity in response times of the solenoid valves from one forming station to another amplify the incidence of acceleration fluctuations or slowing of the insert 8 on the impression-taking from one container 2 to another.

If the known systems do not make it possible to correctly control the rate of travel of the insert 8, this boxing system 14 makes it possible, by contrast, to come close to this objective. For this purpose, the movement of the insert 8 is controlled in three phases:

In a first phase, at the beginning of the travel of the insert 8 (i.e., of the piston 20), at the beginning of the retracted position, the fluid feed rate of the primary chamber 30 is raised over a short time interval, in such a way as to impart to the insert 8 a significant speed (and thus significant inertia) by taking advantage of the fact that the resistant force opposed by the blank 3 during forming is low or zero (FIG. 1);

In a second phase, and up to a median position of the insert 8 (typically at approximately mid-travel), the fluid feed flow rate of the primary chamber 30 is reduced, to reduce the rate of travel of the insert 8 and to make it possible for the material of the blank 3 to be deployed on the insert 8 by taking its impression correctly (FIG. 2), while taking advantage of the inertia acquired by the insert 8 during the first phase;

In a third step, starting from the intermediate position and up to the deployed position—i.e., the end of travel—of the insert 8 (and therefore of the piston 20), the fluid feed flow rate of the primary chamber 30 is raised because the resistant force that is opposed by the blank 3 at the end of forming is higher, and it is advisable for the insert 8 to be able to overcome it to reach its end of travel (FIG. 3).

More precisely, in the first phase, and from the retracted position of the insert 8, the electric signal E is regulated by the processing unit 39 to a high value (typically, an index of 9 on a scale comprising 10 graduations), which places the seal 46 in a lower position in which the section S is large, and even maximum. A high fluid flow rate and pressure result (as indicated by the white arrows in FIG. 1). Since the resistant force opposed by the blank 3 during forming is relatively low, the piston 20 (which is linked to the insert) is moved quickly, at a speed denoted V1 on the lower diagram of FIG. 5. This first phase, initiated during the pre-blow molding and while the latter is coming to an end, lasts several milliseconds (in particular between 10 and 20 ms). At the end of this first phase, the insert has reached a height denoted H1 on the lower diagram of FIG. 5. FIG. 5 illustrates the case where the height H1 is reached before the end of the pre-blow-molding phase, which is generally the case, but it is important to note that according to the inertia of the piston 20 and the insert 8, this height could be reached subsequently, in particular at the end of the pre-blow molding, and even after the beginning of blow molding.

In the second phase, the electric signal E is regulated by the processing unit 39 to a smaller value (typically, an index of 2 on a scale comprising 10 graduations), which places the seal 46 in an intermediate position in which the section S is restricted (FIG. 2), with, consequently, a lower fluid flow rate. The result is a reduction in the rate of travel (denoted V2 on the lower diagram of FIG. 5) of the insert 8, especially as the resistance opposed by the blank 3 increases. However, the inertia acquired by the insert 8 because of its high speed during the first phase (at the speed V1) makes it possible to minimize the response time of the insert 8 after the variation (and more precisely the reduction) of the flow rate imposed by the processing unit 39. The brief impulsion imparted to the insert 8 during the first phase makes it possible to make it resistant to significant pressure variations prevailing in the container 2 (as can be seen in the blow-molding curve, at the top in FIG. 5) when its movement at speed V2 is controlled.

This second phase, essentially longer than the first, is initiated after the height H1 has been reached (i.e., as a reminder, an event that can take place before the end of the pre-blow-molding phase, or subsequently, in particular at the end of the pre-blow molding, and even after the beginning of the blow molding) and is completed after the beginning of the blow molding. Its duration is, for example, approximately 50 ms. At the end of the second phase, the insert has reached a height denoted H2 in the lower diagram of FIG. 5.

In the third phase, the electric signal E is regulated by the processing unit 39 to a value that exceeds that of the second phase (typically of an index of 7 on a scale comprising 10 graduations), which places the seal 46 essentially in the same lower position as in the first phase, in which the section S is significant. The result is a high fluid flow rate and pressure (as indicated by the white arrows in FIG. 3). Since the resistant force opposed by the blank 3 during forming is high, the rate of travel (denoted V3 in the lower diagram of FIG. 5) undergoes, in practice, a reduction in relation to the first phase and the second phase, but the extent of the motor force applied to the insert 8 by the high pressure prevailing in the primary chamber 30 makes it possible for the latter to reach its deployed position, promoting a good impression-taking of the bottom 13 of the container 2.

The pressure variations in the blank 3 during the forming of the latter are illustrated on the upper curve of FIG. 5.

Starting from a zero (relative) pressure, a fluid (such as air) is injected at the pre-blow-molding pressure PP into the blank 3, previously heated to a temperature that exceeds its glass transition temperature (which is approximately 80° C. in the case of PET), during the so-called pre-blow-molding phase. The insert 8 (with the piston 20) is then in its retracted position.

The solenoid valve 37 is then in the retracted position, with the primary chamber 30 being in fluid communication with the free air via the degassing chamber 55 and the drain 56; the pressure prevailing in the secondary chamber 31, equal to that of the secondary source 35 (which can be combined with the pre-blow-molding pressure source PP), keeps the piston 20 (and the insert 8) in the retracted position.

While the pre-blow-molding phase is coming to an end, the processing unit 39 regulates the electric signal E to a first high value E1, which, via the solenoid 47 and the core 45, regulates the section S to a high or low value, which brings about the movement of the piston 20 (with the insert 8) at the first (and high) speed V1, until the first height H1 is reached.

It will be noted that the movement of the insert 8 (operation referred to as boxing) is designed to impart to the material, in addition to the desired shape, an increased deformation rate favorable to the orientation of the molecules (and therefore to the rigidity), as well as a good impression-taking.

Then, after the height H1 is reached, and generally until a time that takes place after the beginning of the blow molding, which consists in injecting a fluid (here, air) into the container at the blow-molding pressure PS, the processing unit 39 regulates the electric signal E to a second value E2, comparatively lower (E2<E1), which, via the solenoid 47 and the core 45, regulates the section S to an intermediate value and brings about the movement of the piston 20 (with the insert 8) at a speed V2 that is lower (V2<V1), up to the median position (height H2).

Whereas the pressure in the container 2 during forming reaches the blow-molding pressure PS, the processing unit 39 regulates the electric signal E to a third value E3, comparatively higher than E2 (E3>E2), which, via the solenoid 47 and the core 45, regulates the section S to a high value and, taking into account the resistance opposed by the container 2, brings about the movement of the piston 20 (with the insert 8) to a speed V3 that is comparatively lower (V3<V2), up to the end of travel (height C).

Although the rate of travel of the insert 8 is reduced at the end of travel, the motor force exerted on the insert by the piston 20 is adequate to move it without it being stopped by the resistant force opposed by the pressure prevailing in the container 2. If the pressure P1 that is obtained from the primary source 33 is equal to the blow-molding pressure, care must be taken nevertheless to ensure that the projected support surface of the container 2 on the insert 8 (which surface corresponds, in the illustrated example, to the section of the opening 7, namely $\pi D^2/4$) is less than the surface of the piston 20 delimiting the primary chamber 30. In practice, the surface of the bottom 13 of the container projected onto a horizontal plane (perpendicular to the axis of displacement of the piston 20) is always less than approximately 40% of the driving surface of the piston 20 (i.e., the surface of the piston 20 delimiting the primary chamber 30). It is thanks to this design that the pressure P1 can be less than the blow-molding pressure while ensuring at the same time full travel of the piston 20.

It will be noted that the forming by pre-blow molding and blow molding can be completed, in a known way, by an axial stretching of the blank 3 by means of a movable stretching rod 57 in the axial direction, which entrains the bottom 140 of the blank 3.

In conclusion, note that the unit 39 can be programmed to vary the electric control signal of the solenoid valve 37 based on additional parameters, including:

The cross-section of the insert 8 (corresponding to the projected surface of the bottom 13 of the container 2 that opposes the movement of the insert 8);

The timing of the forming cycle (including times at which the pre-blow molding, the blow molding, and the recovery are controlled);

The timing of the boxing (including the time at which the movement of the insert 8 from its retracted position is controlled);

The blow-molding pressure PS;

The boxing travel.

The invention claimed is:

1. Molding unit (1) for the manufacturing of a container (2) from a blank (3) made of plastic material, with this molding unit (1) comprising:

a mold (4) equipped with a wall (5) that defines a cavity (6) bearing the impression of the container (2) and an insert (8) that is movable in relation to the wall (5) between a retracted position, in which it extends set back in relation to the cavity (6), and a deployed position, in which it projects at least partially into the cavity (6);

at least one boxing system (14) that comprises a cylinder (15) provided with a cylinder body (16), a piston (20), and a rod (21) that is integral with the piston (20) and on which the insert (8) is attached, with the rod (21) and the piston (20) being integrally movable between a retracted position that corresponds to the retracted position of the insert (8), and a deployed position that corresponds to the deployed position of the insert (8), with the cylinder body (16) and the piston (20) jointly defining, on both sides of the piston (20), a primary chamber (30) that is connected, via a primary fluid circuit (32), to a primary fluid source (33) under a primary pressure (P1), and a secondary chamber (31) that is connected, via a secondary fluid circuit (34), to a secondary fluid source (35) under a comparatively lower secondary pressure (P2), the boxing system (14) comprising:

at least one electrically-operated solenoid valve (37) that is mounted on the primary fluid circuit (32), with the solenoid valve (37) comprising a fluid outlet (38) connected to the primary chamber (30) and defining a passage section (S) having a dimension that can vary varies proportionally based on an electric control signal (E) applied to the solenoid valve (37);

a processing unit (39) connected to the solenoid valve (37) and configured to vary the electric control signal (E) applied to the solenoid valve (37), wherein the passage section (S) of the fluid outlet (38) is defined by the function $$S = K1 \cdot E + K2$$

where K1 is a coefficient (positive, real number) and K2 is a constant.

2. Molding unit (1) according to claim 1, wherein the solenoid valve (37) comprises:
- a case (43) pierced by an opening that forms the fluid outlet (38) connected to the primary chamber (30),
- a movable assembly (44) provided with a ferromagnetic core (45) and a seal (46) whose position in relation to the fluid outlet (38) determines the flow rate of fluid that travels through the latter,
- a solenoid (47) that is integral with the case (43) and that surrounds the core (45), with this solenoid (47) having two electric terminals (48, 49) to which the electric control signal (E) is applied,
- and wherein the processing unit (39) is programmed to vary the electric signal (E) applied to the terminals (48, 49) of the solenoid (47).

3. Molding unit (1) according to claim 1, wherein the electric signal (E) is an electric intensity.

4. Molding unit (1) according to claim 1, wherein the electric signal (E) is an electric voltage.

5. Molding unit (1) according to claim 1, further comprising a sensor that can make it possible to determine the position or the speed of the insert (8) during its movement from the retracted position to the deployed position, and wherein the processing unit (39) is programmed to vary the electric control signal of the solenoid valve (37) based on the position or the speed of the insert (8).

6. Molding unit (1) according to claim 5, wherein the processing unit (39) is programmed to vary the electric control signal of the solenoid valve (37) based on additional parameters that are selected from among:
- the cross-section of the insert (8);
- the timing of the forming cycle;
- the timing of the boxing;
- the blow-molding pressure (PS);
- the boxing travel.

7. Molding unit (1) according to claim 2, wherein the electric signal (E) is an electric intensity.

8. Molding unit (1) according to claim 2, wherein the electric signal (E) is an electric voltage.

9. Molding unit (1) according to claim 2, further comprising a sensor that can make it possible to determine the position or the speed of the insert (8) during its movement from the retracted position to the deployed position, and wherein the processing unit (39) is programmed to vary the electric control signal of the solenoid valve (37) based on the position or the speed of the insert (8).

10. Molding unit (1) according to claim 3, further comprising a sensor that can make it possible to determine the position or the speed of the insert (8) during its movement from the retracted position to the deployed position, and wherein the processing unit (39) is programmed to vary the electric control signal of the solenoid valve (37) based on the position or the speed of the insert (8).

11. Molding unit (1) according to claim 4, further comprising a sensor that can make it possible to determine the position or the speed of the insert (8) during its movement from the retracted position to the deployed position, and wherein the processing unit (39) is programmed to vary the electric control signal of the solenoid valve (37) based on the position or the speed of the insert (8).

12. Molding unit (1) according to claim 7, further comprising a sensor that can make it possible to determine the position or the speed of the insert (8) during its movement from the retracted position to the deployed position, and wherein the processing unit (39) is programmed to vary the electric control signal of the solenoid valve (37) based on the position or the speed of the insert (8).

13. Molding unit (1) according to claim 8, further comprising a sensor that can make it possible to determine the position or the speed of the insert (8) during its movement from the retracted position to the deployed position, and wherein the processing unit (39) is programmed to vary the electric control signal of the solenoid valve (37) based on the position or the speed of the insert (8).

* * * * *